(12) United States Patent
Yamamoto et al.

(10) Patent No.: US 7,194,453 B2
(45) Date of Patent: Mar. 20, 2007

(54) IMAGE RETRIEVAL METHOD AND APPARATUS

(75) Inventors: Kunihiro Yamamoto, Kanagawa (JP); Kentaro Matsumoto, Tokyo (JP); Kiyoshi Kusama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 09/818,391

(22) Filed: Mar. 27, 2001

(65) Prior Publication Data

US 2002/0009231 A1  Jan. 24, 2002

(30) Foreign Application Priority Data

Mar. 29, 2000  (JP) .............................. 2000-091316

(51) Int. Cl.
*G06F 17/30* (2006.01)
*G06F 7/00* (2006.01)
*H04N 5/235* (2006.01)

(52) U.S. Cl. ...................... 707/3; 707/104.1; 382/217
(58) Field of Classification Search .................. 707/1, 707/3, 104.1; 382/224, 217
See application file for complete search history.

(56) References Cited

U.S. PATENT DOCUMENTS

| 5,793,885 | A | * | 8/1998 | Kasson ...................... 382/167 |
| 5,801,773 | A | * | 9/1998 | Ikeda ....................... 348/229.1 |
| 5,848,198 | A | * | 12/1998 | Penn ........................ 382/276 |
| 5,872,865 | A | * | 2/1999 | Normile et al. ............. 382/224 |
| 5,899,999 | A | * | 5/1999 | De Bonet ................. 707/104.1 |
| 5,915,038 | A | * | 6/1999 | Abdel-Mottaleb et al. .. 382/209 |
| 6,058,207 | A | * | 5/2000 | Tuijn et al. ................. 382/162 |
| 6,137,498 | A | * | 10/2000 | Silvers ....................... 345/629 |
| 6,249,607 | B1 | * | 6/2001 | Murakawa ................. 382/199 |
| 6,263,113 | B1 | * | 7/2001 | Abdel-Mottaleb et al. .. 382/237 |
| 6,400,853 | B1 | * | 6/2002 | Shiiyama .................... 382/305 |
| 6,404,925 | B1 | * | 6/2002 | Foote et al. ................ 382/224 |
| 6,411,291 | B2 | * | 6/2002 | Shiiyama .................... 345/419 |
| 6,463,426 | B1 | * | 10/2002 | Lipson et al. .................. 707/3 |
| 6,724,946 | B1 | * | 4/2004 | Kusama et al. ............. 382/284 |
| 6,757,428 | B1 | * | 6/2004 | Lin et al. .................... 382/165 |

FOREIGN PATENT DOCUMENTS

| JP | 03-246777 | 11/1991 |
| JP | 09-259277 | 10/1997 |
| JP | 10-154149 | 6/1998 |
| JP | 11-175718 | 7/1999 |

* cited by examiner

*Primary Examiner*—Jeffrey Gaffin
*Assistant Examiner*—Cindy Nguyen
(74) *Attorney, Agent, or Firm*—Cowan, Liebowitz & Latman, P.C.

(57) ABSTRACT

A plurality of images and image features of each of the plurality of images are stored in a form correlated with the images in an external storage device of an image retrieval apparatus. In retrieval of a desired image from the plurality of images that have been stored in the external storage device, a plurality of image features regarding one image are acquired by varying, over a predetermined range, each of the image features that have been stored in the external storage device. A fuzzy image search is conducted by calculating the degree of similarity between each of the plurality of images and a retrieval source image based upon the image features that have been acquired and the image features of the retrieval-source image.

11 Claims, 11 Drawing Sheets

FIG. 11

| (0,0) $\alpha(0)$ | (1,0) $\alpha(1)$ | (2,0) $\alpha(2)$ |
|---|---|---|
| (0,1) $\alpha(3)$ | (1,1) $\alpha(4)$ | (2,1) $\alpha(5)$ |

IMAGE RETRIEVAL METHOD AND APPARATUS

FIELD OF THE INVENTION

This invention relates to an image retrieval method and apparatus for retrieving a desired image from a plurality of images.

BACKGROUND OF THE INVENTION

Various image retrieval methods have been proposed for retrieving a desired image from a database storing data representing a number of images. These methods can be classified broadly into two types, namely (1) a method in which non-image information such as keywords or dates of photography are correlated with images and retrieval is conducted based upon this non-image information, and (2) a method in which retrieval is conducted based upon the features (luminance or color-difference information, image frequency, histogram, etc.) of the images per se.

The latter method, which is referred to as a similar-image search, presents a certain image to a database and searches the database using a feature of the image as a search key. This method is advantageous in that a user who does not possess special knowledge concerning image processing can be provided with a search interface that is intuitively easy to understand.

When a search is conducted based upon the memory of the user, an accurate match between the actual image and the image remembered by the user is rare. It is desirable, therefore, to conduct a search by presenting the database with an image where the understanding is that the presented image may not be exactly the same as that being sought. With the usual similar-image search method, however, the desired image cannot be retrieved unless image brightness or color tone is reproduced accurately.

SUMMARY OF THE INVENTION

Accordingly, an object of the present invention is to make possible image retrieval that accurately reflects the user's intention when a similar-image search is conducted using a presented image that is based upon the user's memory.

Another object of the present invention is to make it possible to acquire a desired image easily even when the reproduction of image brightness or color tone is ambiguous.

According to the present invention, the foregoing object is attained by providing an image retrieval apparatus for retrieving a desired image from a plurality of stored images, comprising: storage means for storing the plurality of images and image features of each of the plurality of images in a form correlated with the images; feature calculation means for calculating image features of a retrieval source image; acquisition means for acquiring a plurality of image features regarding one image by varying, within a predetermined range, the image features that have been stored in the storage means; and retrieval means for performing image retrieval by calculating degree of similarity between each of the plurality of images and the retrieval source image based upon the image features acquired by the acquisition means and the image features calculated by the feature calculation means.

Preferably, the acquisition means varies a luminance component over N steps with regard to each image feature, thereby excluding effects ascribable to differences in conditions such as illumination. This makes it possible to perform a similar-image search that is more in line with human perception.

Preferably, the acquisition means varies a color-difference component over N stages with regard to each image feature, thereby making it possible to perform retrieval that takes into account the fuzziness human beings possess with regard to color.

Preferably, the retrieval means calculates degree of similarity between each image that has been stored in the storage means and the retrieval-source image using the plurality of image features acquired by the acquisition means, and adopts maximum degree of similarity as the degree of similarity between a particular image and the retrieval-source image. Because use is made of the maximum degree of similarity obtained while varying features, the features are essentially optimized.

Preferably, the acquisition means varies a luminance component or a color-difference component of an image feature in stepless fashion.

Preferably, the acquisition means is such that an operator can specify a number of steps over which image features are varied as well as the amount of change provided by each step. This makes it possible to conduct a fuzzy-image match search.

Further, according to the present invention, the foregoing object is attained by providing an image retrieval apparatus for retrieving a desired image from a plurality of stored images, comprising: storage means for storing the plurality of images and image features of each of the plurality of images in a form correlated with the images, wherein the image features have been acquired for each one of tiles obtained by dividing an image into a predetermined number of tiles; feature calculation means for dividing a retrieval-source image into a predetermined number of tiles and calculating image features for every tile; acquisition means for acquiring, with regard to each of the plurality of images that have been stored in the storage means, new image features by varying image features by an amount of change that differs for every tile; and retrieval means for performing image retrieval by calculating degree of similarity between each of the plurality of images and the retrieval source image based upon the image features acquired by the acquisition means and the image features calculated by the feature calculation means.

In accordance with this arrangement, the amount of change in a feature is made to differ for every tile, thereby making it possible to reduce the amount of calculation of degree of similarity in ambiguous retrieval.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a diagram useful in describing assignment of a coefficient α for ambiguous retrieval.

DESCRIPTION OF THE PREFERRED EMBODIMENTS

A preferred embodiment of the present invention will now be described in detail in accordance with the accompanying drawings.

Figure 1:
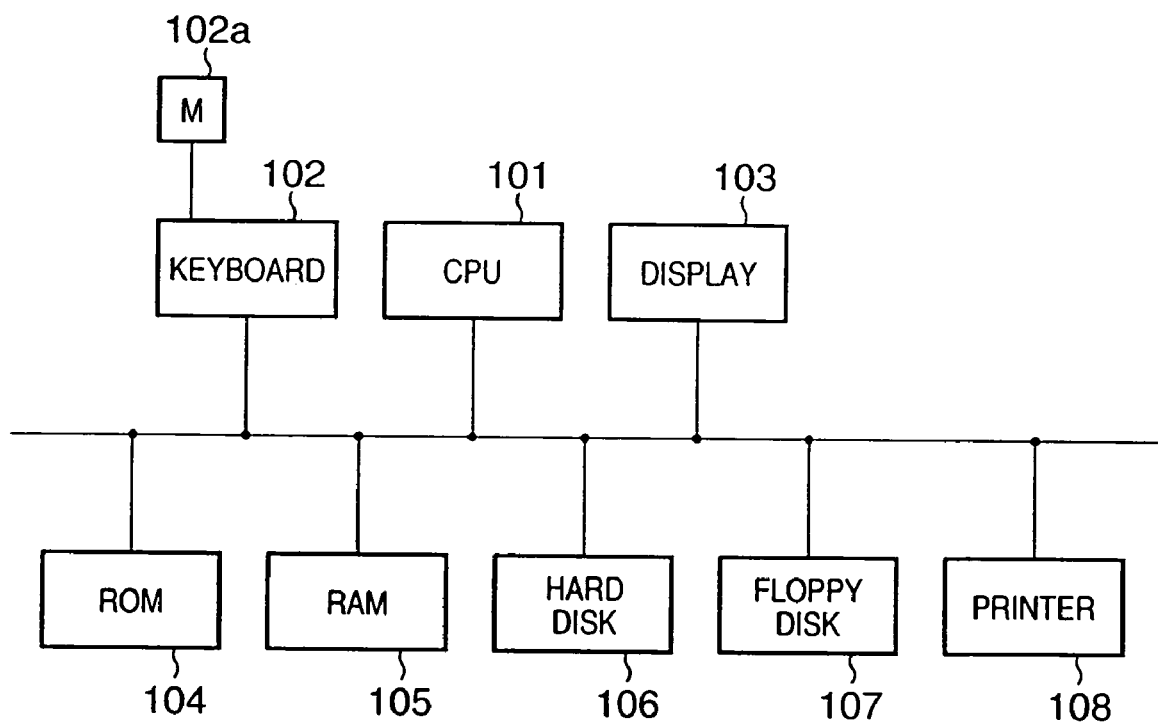
FIG. 1 is a block diagram illustrating the configuration of a computer system for implementing image retrieval processing according to an embodiment of the present invention.

FIG. 1 is a block diagram illustrating the configuration of a computer system for implementing image retrieval processing according to an embodiment of the present invention.

In FIG. 1, a CPU 101 controls the overall system of this embodiment. A keyboard 102 is used together with a mouse 102a to input operating information to the system. A display unit 103 is constituted by a CRT or liquid crystal panel. A ROM 104 and a RAM 105 construct the storage devices of the system and store a control program executed by the CPU 101 and data utilized by the CPU 101. A hard disk 106 and a floppy disk 107 construct external storage devices used as a file system for this system. The system further includes a printer 108.

Figure 9:
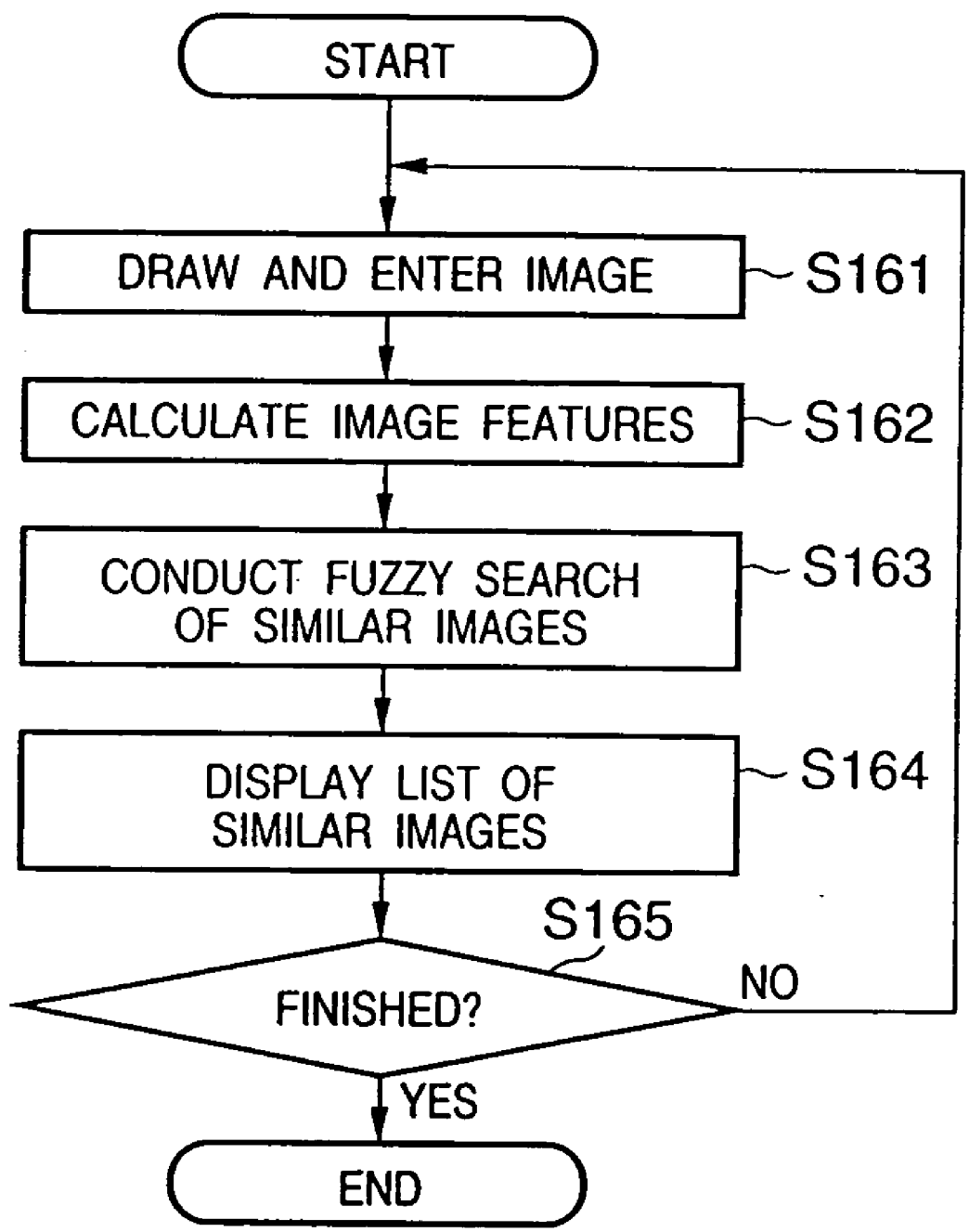
FIG. 9 is a flowchart illustrating the essentials of image retrieval processing according to this embodiment.

FIG. 9 is a flowchart illustrating the essentials of image retrieval processing according to this embodiment.

In FIG. 9, the user draws a desired illustration (referred to simply as an "image" below) on the screen of the display unit 103 at step S161. Next, at step S162, a feature of the drawn image is calculated. This is followed by step S163, at which similar images are retrieved by a fuzzy match search based upon this feature. The similar images obtained by such retrieval are then displayed on the display unit 103 at step S164. It is then determined at step S165 whether the retrieval operation has been completed. Control returns to step S161 if retrieval is to continue and retrieval processing is exited if retrieval has been completed.

The details of steps 161 to 165 will be described below in greater detail.

[Step 161]

Figure 2:
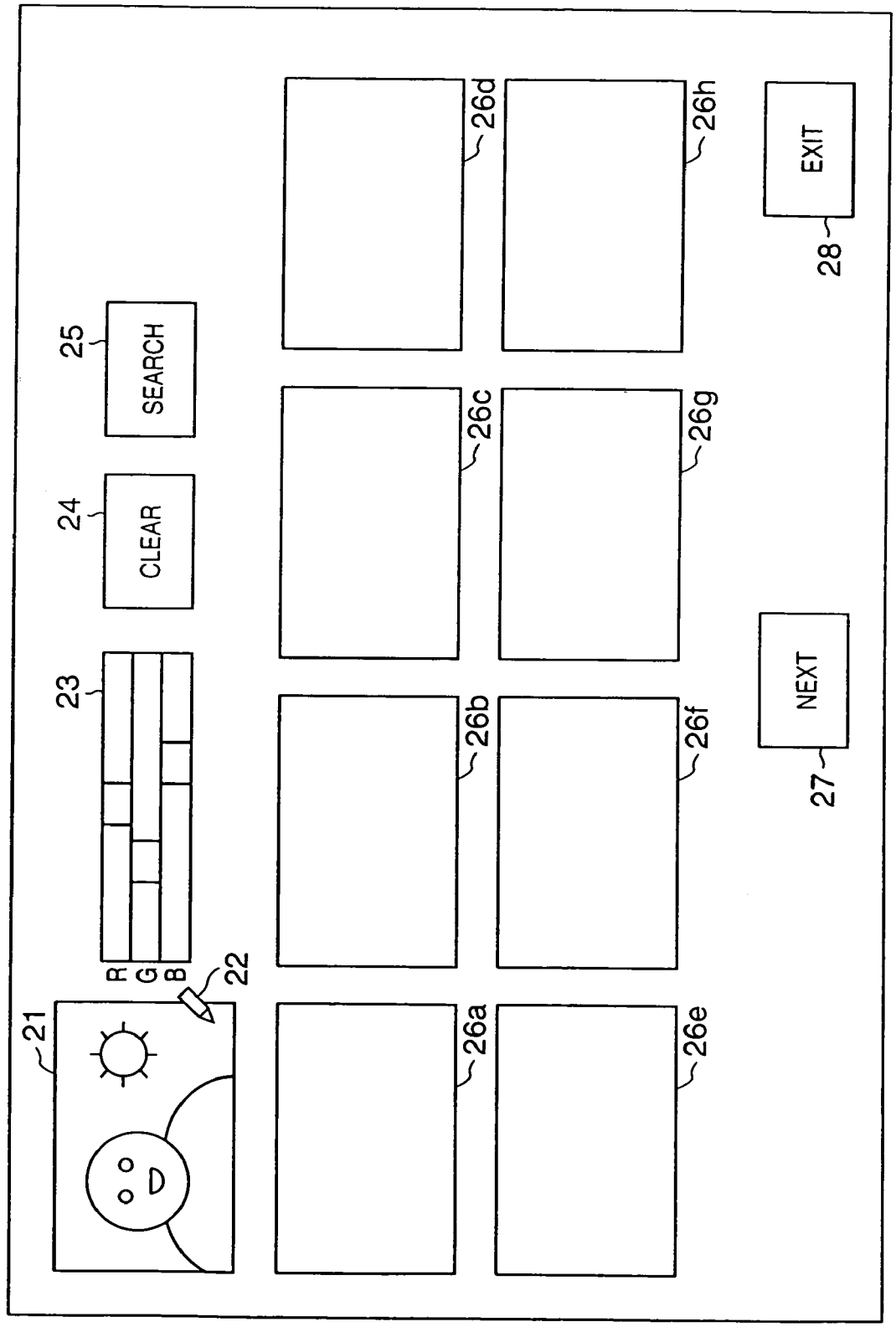
FIG. 2 is a diagram illustrating an example of a retrieval control screen according to this embodiment.

A retrieval control screen is displayed on the display unit 103, as illustrated in FIG. 2, at step S161.

As shown in FIG. 2, a drawing area 21 allows a user to draw a desired image by manipulating a drawing tool 22 (as by a mouse 102a, by way of example). A color designating scroll bar 23 is for setting a desired color by designating the luminance of each of the color components red (R), green (G) and blue (B). A clear button 24 is for clearing the drawing area 21 (e.g., as by filling the entire area 21 with white). A search button 25 is for designating the start of a search for similar images. Retrieved-image display areas 26a to 26h display, in decreasing order of degree of similarity, images obtained as a result of a similar-image search (step S163), described below. A next-page button 27 is used when search results of a lower order are to be displayed in the retrieved-image display areas 26a. An exit button 28 is used to exit this image retrieval processing.

After the user draws the illustration in the drawing area 21 at step S161, control proceeds to step S161 at an appropriate timing. The processing of step S161 will be described with reference to the flowchart of FIG. 3.

Figure 3:
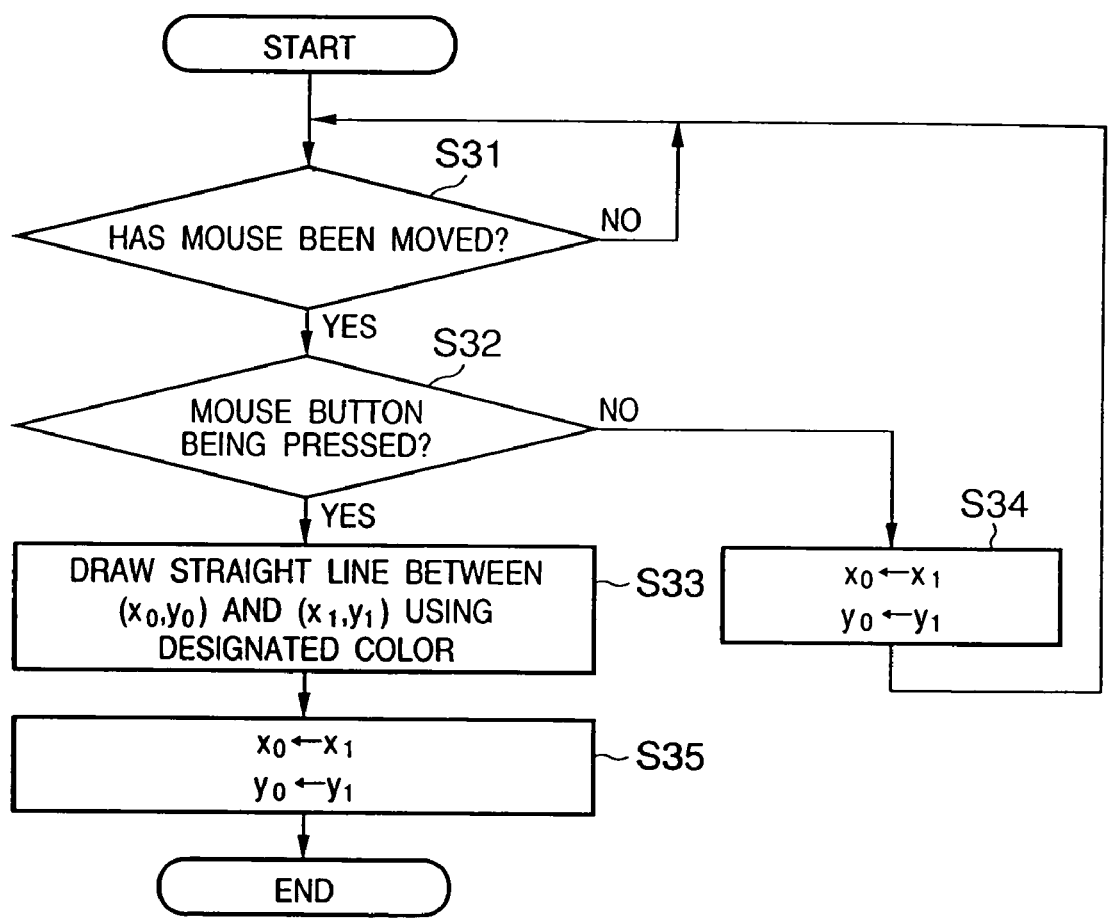
FIG. 3 is a flowchart useful in describing the details of image drawing processing at a step S161 in FIG. 9.

FIG. 3 is a flowchart useful in describing the details of image drawing processing at a step S161 in FIG. 9. Here $x_0$, $y_0$ represent variables stored as the immediately preceding position of the mouse pointer, and $x_1$, $y_1$ represent variables stored as the current position of the mouse pointer.

It is determined at step S31 whether the mouse 102a has been moved by the user. Here it is determined whether the mouse pointer (which serves as the drawing tool 22 when it is placed inside the drawing area 21) has been moved by manipulation of the mouse 102a. Control returns to step S31 if the mouse has not been moved. That is, step S31 forms a loop for monitoring movement of the mouse 102a. If the mouse 102a is moved, control proceeds to step S32.

It is determined at step S32 whether a mouse button on the mouse 102a is being pressed. If the button is not being pressed, control proceeds to step S34, where the current position $(x_1, y_1)$ of the mouse pointer is substituted for $(x_0, y_0)$. Control then returns to step S31. As a result, the mouse pointer merely moves without drawing being performed.

On the other hand, if it is found at step S32 that the mouse button is being pressed, i.e., that a drag operation is in progress, control proceeds to step S33. Here a straight line connecting the immediately preceding position $(x_0, y_0)$ of the mouse pointer and the current position $(x_1, y_1)$ of the mouse pointer is drawn in a color decided by the color designating scroll bar 23.

This is followed by step S35, at which the current position $(x_1, y_1)$ of the mouse pointer is substituted for $(x_0, y_0)$ and the processing of FIG. 3 is exited. Step S161 ends at this time and control proceeds to step S162. Thus, control proceeds to the steps from S162 onward whenever the drawing of a new line is carried out. As seen from the user, therefore, it appears that search processing is executed automatically when an addition is made to the illustration by drawing.

If search processing were executed each time a very small straight line was drawn, processing speed would not be sufficient for follow-up and the apparatus would most likely become difficult to use. Accordingly, it is so arranged that the transition to step S162 is carried out whenever a straight line over a predetermined length is drawn.

[Step S162]

An image feature of an image that has been drawn in the drawing area 21 is calculated at step S162.

In the calculation of features according to this embodiment, an image is divided into a plurality of areas, the average values of respective ones of the R, G, B values in each area are calculated and the average values are adopted as the features. Calculation of features according to this embodiment will now be described in detail.

Figure 4:
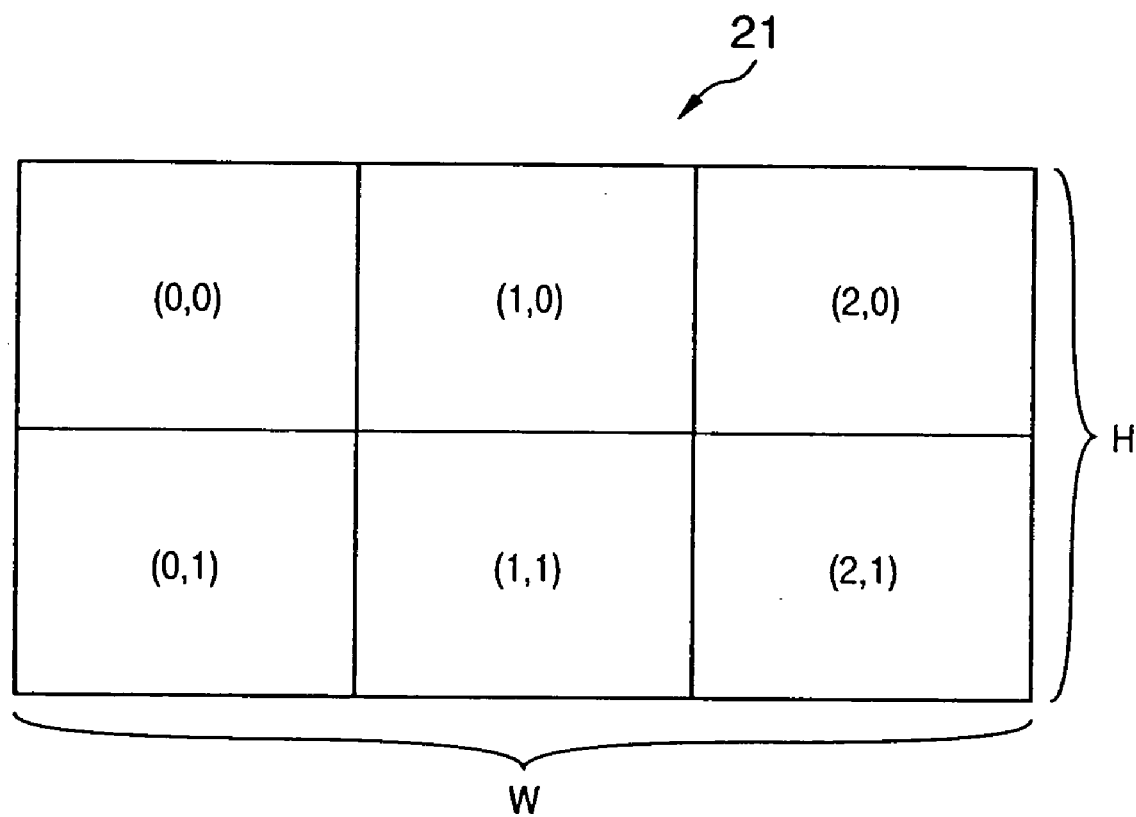
FIG. 4 is a diagram illustrating the division of an image for calculating a feature.

FIG. 4 is a diagram illustrating how an image is divided in order to calculate features. As shown in FIG. 4, the size of the drawing area 21 is W-number of pixels in the horizontal direction and H-number of pixels in the vertical direction. The drawing area 21 is divided into three areas horizontally and two areas vertically, for a total of six areas, and the areas are denoted by (0,0), (1,0), . . . , (2,1) in order starting from the upper left. The average values of respective ones of the R, G, B values of each of these areas are calculated, for a total of 18 numerical values, and constitute the features of the image desired to be retrieved.

The flow of processing for calculating the features mentioned above will be described further with reference to the flowchart of FIG. 5.

Figure 5:
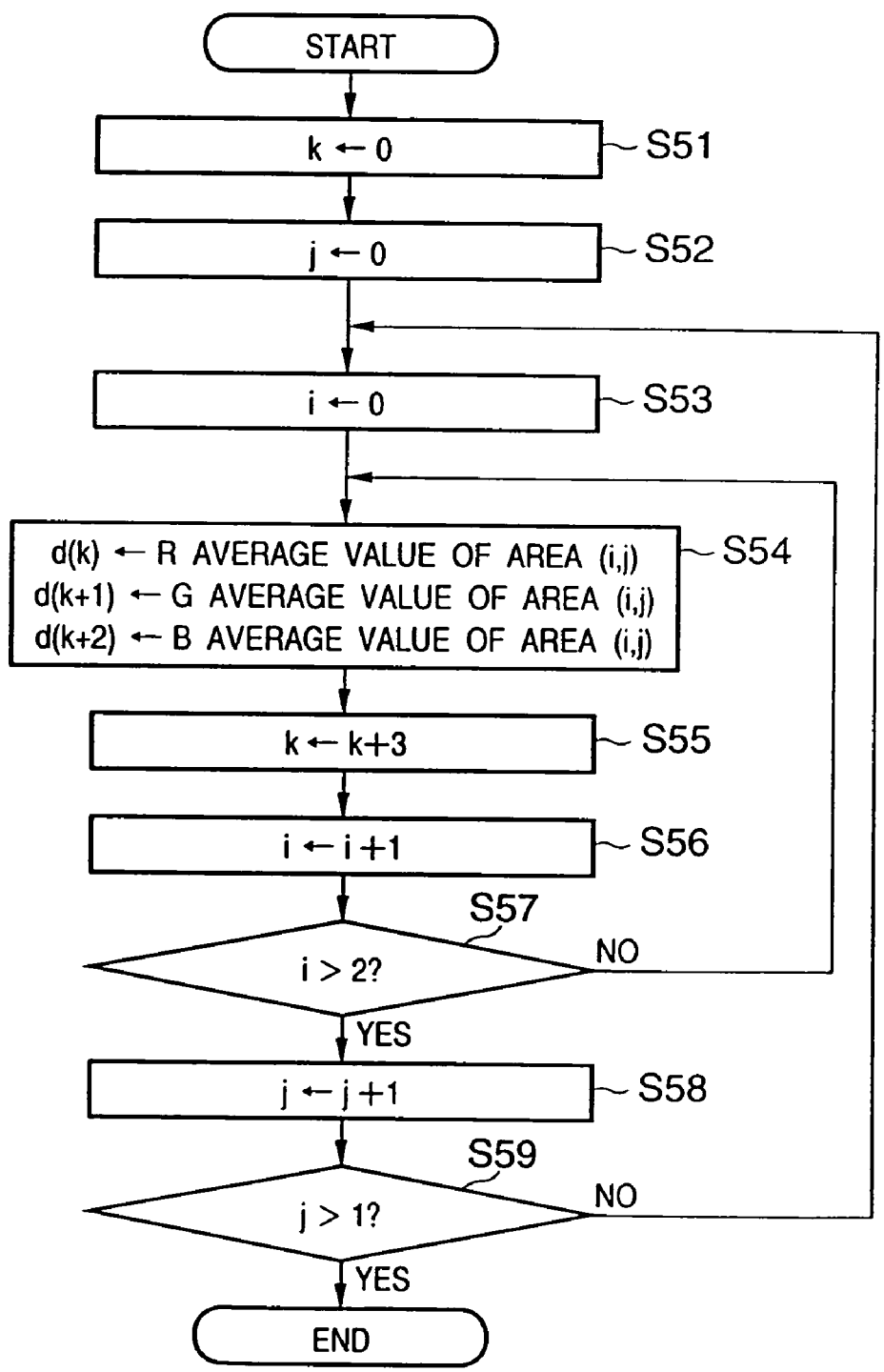
FIG. 5 is a flowchart useful in describing processing for calculating a feature according to this embodiment.

FIG. 5 is a flowchart useful in describing processing for calculating features according to this embodiment.

As shown in FIG. 5, a variable k is initialized to a value 0 at step S51, a variable j is initialized to a value 0 at step S52 and a variable i is initialized to a value 0 at step S53.

Next, at step S54, the average value of the R values of one area (i,j) in an image represented by the image drawing at the step S161 is substituted for the kth element d(k) of an array d. Further, the average value of the G values is substituted for d(k+1) and the average value of the B values is substituted for d(k+2). It should be noted that the method of calculating the average values of the R, G, B values will be described later with reference to the flowchart of FIG. 6.

Next, k is incremented by 3 at step S55 and i is incremented by 1 at step S56. Next, i is compared with the value 2 at step S57 and control proceeds to step S58 if i is greater than 2 or returns to step S54 if it is not. Next, j is incremented by 1 at step S58, the value of j is compared with the value 1 at step S59 and processing is completed if j is greater than 1. If j is not greater than 1, control returns to step S53.

If processing is completed, the features of the image desired to be retrieved are stored in the array d( ), which has 18 elements. More specifically, 18 values, namely the average value of R in area (0,0), the average value of G in area (0,0), the average value of B in area (0,0), the average value of R in area (1, 0), . . . , the average value of B in area (2,1), are stored in the order mentioned.

In the example set forth above, the image is divided into six areas, as shown in FIG. 4, in order to calculate the features of the image. The variable i and the value 2 are compared at step S57, therefore, and the variable j and value 1 are compared at step S59. However, it is obvious that if the number of divisions of the image is changed, then the above-mentioned values also will change accordingly. In a case where the number of divisions is changed, the number of elements of the feature will not be 18 but will increase or decrease accordingly.

Further, according to this embodiment, the image is divided into six rectangles of equal area, as shown in FIG. 4. However, division into rectangular areas does not impose a limitation upon the invention; the image may be divided into more complicated shapes.

Figure 6:
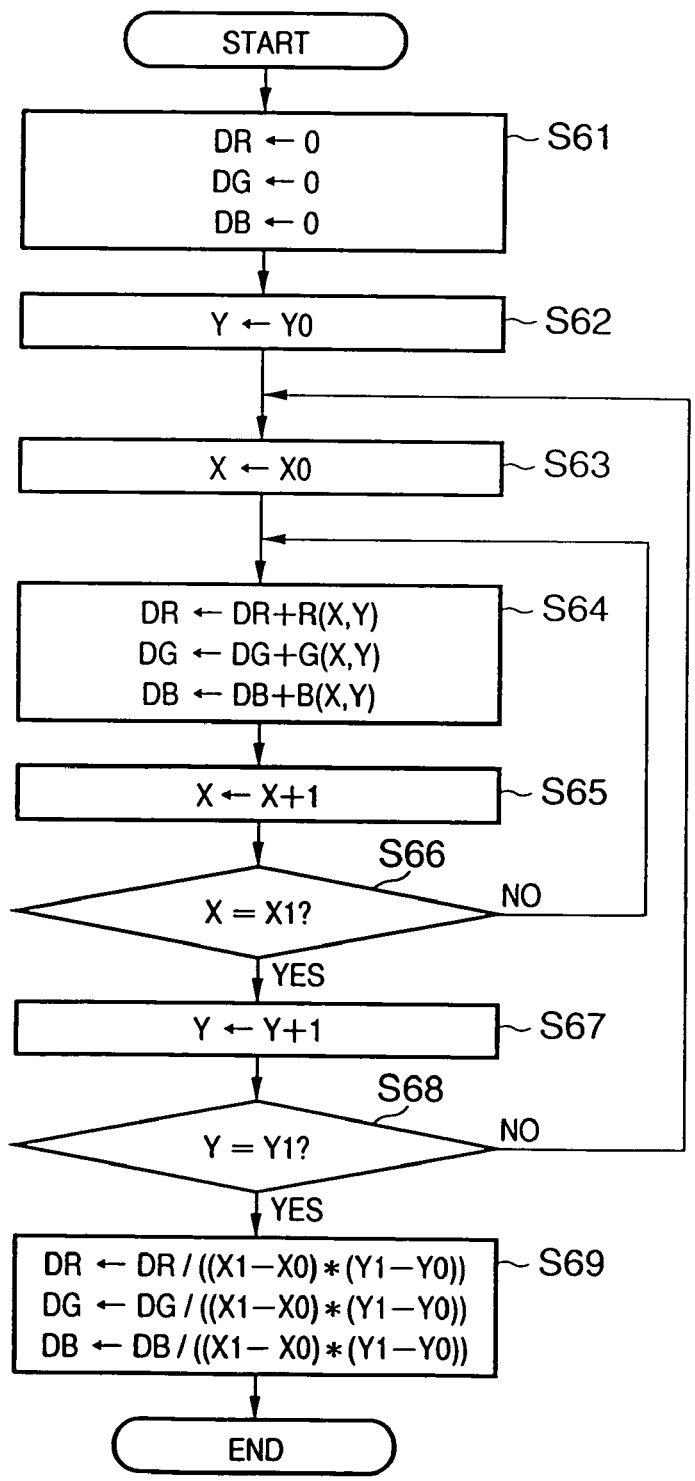
FIG. 6 is a flowchart useful in describing a method of calculating average values of R, G, B values on a per-area basis according to this embodiment.

FIG. 6 is a flowchart useful in describing a method of calculating average values of R, G, B values on a per-area basis according to this embodiment. It is assumed here that the image data has been stored in three arrays R(X,Y), G(X,Y), B(X,Y), where $0 \leq X < W$ and $0 \leq Y < H$ hold and the upper left-hand corner of the image is taken as the origin (0,0). In the flow described below, average density is calculated in a partial area delimited by $X0 \leq X < X1$, $Y0 \leq Y < Y1$ and the average densities of R, G, B are returned to variables DR, DG, DB, respectively.

Since the area corresponding to area (i, j) at step S54 in FIG. 5 corresponds to $X0 = W \times i/3$, $X1 = W \times (i+1)/3$ $Y0 = H \times j/2$, $Y1 = H \times (j+1)/2$ the flowchart shown in FIG. 6 is executed after the constants X0, X1, Y0, Y1 are initialized in the manner described above.

First, the variables DG, DG, DB are initialized to 0 at step S61, the variable Y is initialized to Y0 at step S62, and the variable x is initialized to X0 at step S63. Next, R(X,Y) is added to DR at step S64. Similarly, G(X,Y), B(X,Y) are added to DG and DB, respectively, at step S64.

The variable X is incremented by 1 at step S65 and the variable X and X1 are compared at step S66. Control proceeds to step S67 if they are equal but returns to step S64 if they are not. The variable Y is incremented by 1 at step S67 and the variable Y and Y1 are compared at step S68. Control proceeds to step S69 if they are equal but returns to step S63 if they are not. Thus, the sums of the color values of the respective ones of the color components of all pixels in the area (i,j) are obtained.

Next, at step S69, the variables DR, DG, DB are each divided by the number of pixels in the area [i.e., by (X1−X0)×(Y1−Y0)]. As a result, DR, DG, DB become the average densities obtained by dividing the pixel densities in the area by the number of pixels.

<Step S163>

Retrieval of similar images is performed at step S163 based upon the image feature described above.

It is assumed that image data representing N-number of images has been stored on the hard disk 106, that the features of each image have been calculated beforehand by a method the same as that described above, and that these features have been stored. The image data may be stored in a standard file format such as the well-known JPEG or Flash-Pix format or in a unique format in a so-called RDBMS (Relational Database Management System).

Further, it is assumed that the image features have been stored in a two-dimensional array D(n,i) having a size of N×18 (where $0 \leq n < N$, $0 \leq i < 18$).

An image-to-image distance S(n), namely a distance between a submitted image and an nth image, is defined by the following equation:

$$S(n) = \sum_i [D(n, i) \times \alpha - d(i)]^2$$

The smaller the image-to-image distance S(n), the higher the degree of similarity of the image is judged to be. Here $\alpha$ represents a coefficient that reflects the degree of ambiguity and takes on a value within appropriate limits. If the degree of similarity is calculated only at $\alpha = 1.0$, then the comparison will be an exact comparison in which there is no ambiguity. On the other hand, if the value of $\alpha$ is 0.8, for example, then the submitted image will be compared with darker images obtained by reducing the luminance of each image in the database by 20% overall. In a routine set forth below, the value of $\alpha$ is varied, the degree of similarity at each value of $\alpha$ is calculated, and the image for which the image-to-image distance S(n) is smallest (i.e., the image for which the degree of similarity is highest) is adopted. This means that a calculation of image-to-image distance that includes calculation of the optimum $\alpha$ is carried out.

In the search and retrieval of images according to this embodiment, first image-to-image distances S(n) ($0 \leq n \leq N$) between the submitted image and all N images are calculated, then M (0<M<N) of these distances are selected in order starting from the smaller values of the image-to-image distance S(n). The method through which the image-toimage distance S(n) is calculated will be described below with reference to FIG. 7, and the procedure through which the M images are selected will be described with reference to FIG. 8.

The method of calculating image-to-image distance that reflects degree of ambiguity will be described with reference to FIG. 7, which is a flowchart useful in describing the procedure for calculating image-to-image distance (degree of similarity) according to this embodiment. It is assumed that the array α( ) has three elements and that α(0)=0.8, α(1)=1.0, α(2)=1.2 hold in this example. In this case, a fuzzy-match search having a degree of ambiguity of ±20% is conducted.

First, at step S71, the variable n is initialized to a value 0 at step S71, the variable j is initialized to a value 0 and S(n) is initialized to a sufficiently large value at step S72, and the variable i is initialized to a value 0 and S is initialized to a value 0 at step S73.

The square of the difference between D(n,i)×a(j) and d(i) is added to S at step S74, and the variable i is incremented by 1 at step S75. The variable i and the value 18 are compared at step S76, control proceeds to step S77 if the two are equal and returns to step S74 to repeat the processing of steps S74 and S75 if the two are not equal.

The above processing accumulates, and stores as S, the difference values for the 18 features at α(j) between the presented image and the images that have been registered in the database.

At step S77, S(n) and S are compared. Control proceeds to step S78 if S(n) is smaller; otherwise, control proceeds to step S79. Step S78 calls for S to be substituted for S(n), and the variable j is incremented by 1 at step S79. The variable j and value 3 are compared at step S7A, control proceeds to step S7B if the two are equal and returns to step S73 if the two are not equal. By virtue of this processing, the smallest value among the image-to-image distances using α(0) to α(2) is stored as S(n).

The variable n is incremented by the value 1 at step S7B, and the variable n is compared with N at step S7C. Control is exited if the two are equal; otherwise, control returns to step S72.

In accordance with the processing described above, the image-to-image distances between the presented image and all stored images are stored as the array S(n). Further, each image-to-image distance reflects a degree of ambiguity. From among the three image-to-image distances prevailing when a direction comparison is made and the three prevailing when a comparison is made after brightening (or darkening) an overall image by ±20%, the smallest distance is stored.

When images are compared with each other, emphasis is placed on the luminance and color-difference distributions within the images. If an image is bright (or dark) overall, then this can be ascribed merely to a difference in conditions such as illumination and can be ignored. The above-described algorithm which adopts the α for which S calculated at step S74 will be minimized makes it possible to conduct a similar-image search that more closely approximates human perception.

The above-described processing calculates the image-to-image distance S(n) between each stored image and the presented image while α is varied and retains the smallest value as the image-to-image distance S(n) between the particular stored image and the presented image.

Figure 7:
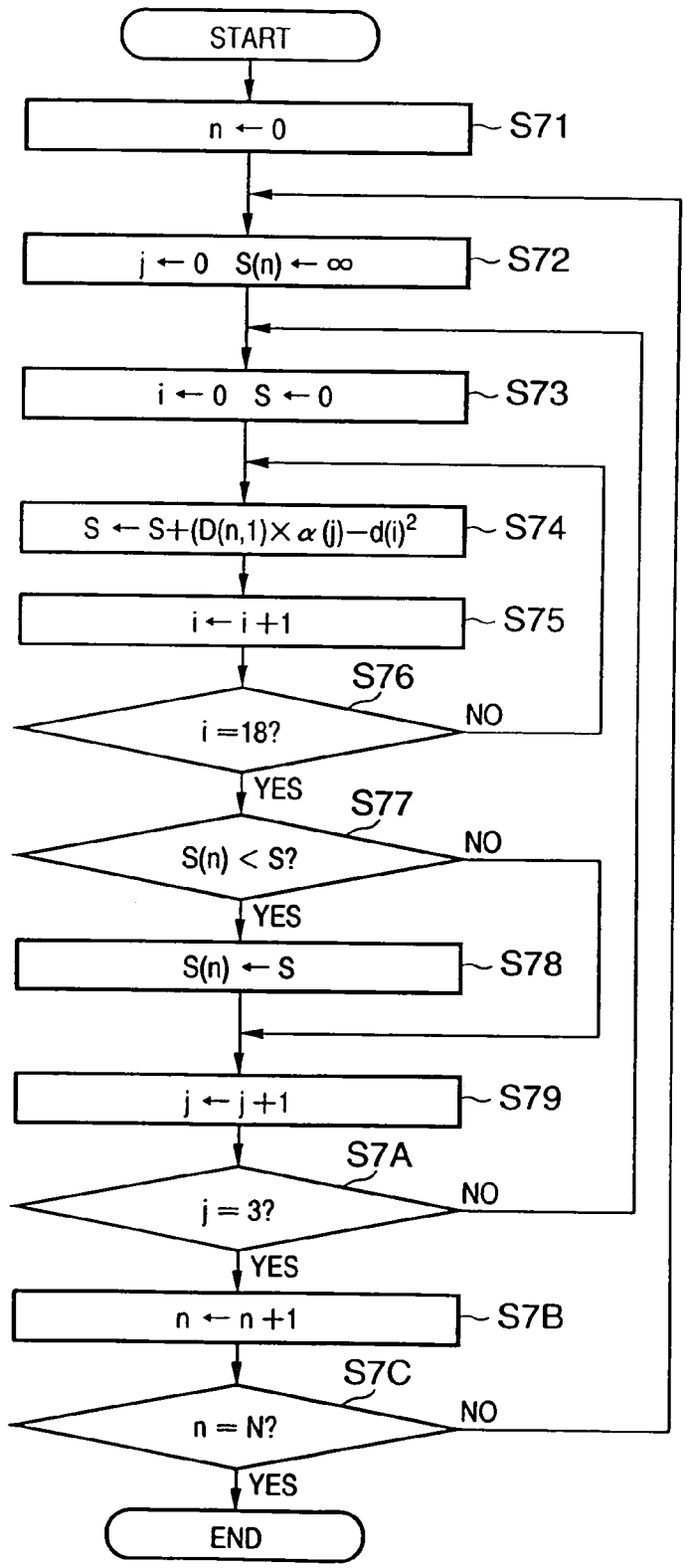
FIG. 7 is a flowchart useful in describing a procedure for calculating the distances (degrees of similarity) between images according to this embodiment.
Figure 8:
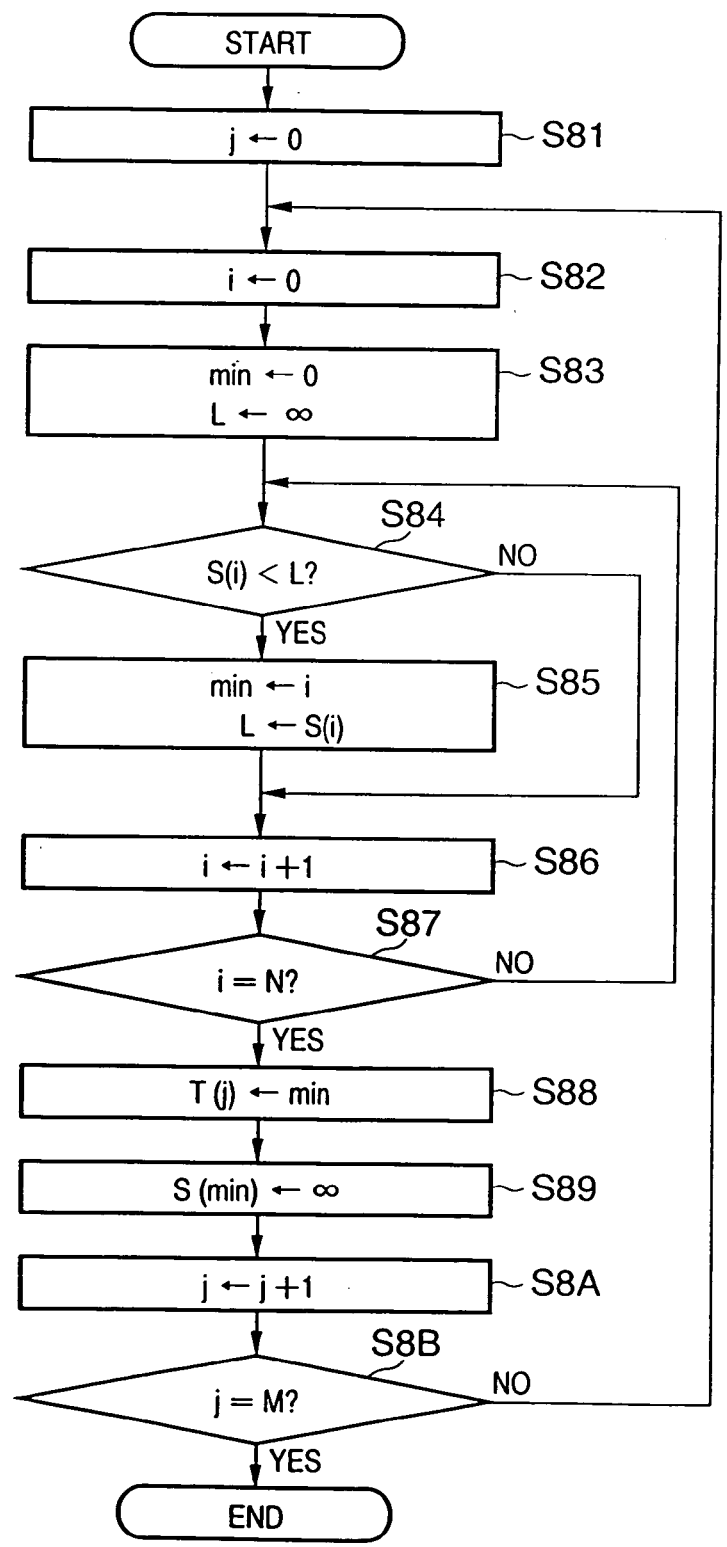
FIG. 8 is a flowchart useful in describing a procedure for selecting a similar image according to this embodiment.

Reference will now be had to FIG. 8 to describe processing for selecting M-number of distances in order starting from the smaller image-to-image distances S(n), which were obtained by the processing of FIG. 7, and storing the image numbers thereof in an array T( ).

FIG. 8 is a flowchart useful in describing a procedure for selecting similar images according to this embodiment.

In FIG. 8, the variable j is initialized to the value 0 at step S81, the variable i is initialized to the value 0 at step S82, and the variable min is initialized to the value 0 and L is made a sufficiently large value at step S83.

Next, the ith image-to-image distance S(i) and L are compared at step S84. Control proceeds to step S85 if S(i)<L holds; otherwise, control returns to step S86. The value i is substituted into the variable min and S(i) is substituted into L at step S85. Next, i is incremented by 1 at step S86.

This is followed by step S87, at which i and N are compared. Control proceeds to step S88 if the two are equal and control returns to step S83 if they are not equal. The value min is substituted into T(j) at step S88, and a sufficiently large value is substituted into S(min) at step S89. Next, j is incremented by 1 at step S8A, j and M are compared at step S8B, control is completed if they are equal and control returns to step S82 if they are not equal.

By virtue of the processing described above, image numbers are stored in the array T(j) (0≦j<M−1) in decreasing order of similarity to the submitted image.

<Step S164>

FIG. 9 is a diagram illustrating an example of a control screen displayed on the display unit 103 at step S24 in FIG. 2.

The specifics of processing at step S164 for displaying a list of similar images will be described in accordance with the control screen of FIG. 2.

As shown in FIG. 2, similar images retrieved by the above-described processing are displayed in thumbnail form in the areas 26a to 26h. An image corresponding to image number T(0), which is the number of the image having the highest degree of similarity [the smallest value of S(n)], is displayed in the area 26a; an image corresponding to T(1) is displayed in the area 26b; . . . ; and an image having the lowest degree of similarity [the largest value of S(n)] among these images is displayed in area 26h.

The stored image data may be decoded and displayed on the screen as thumbnails in the areas 26a to 26h. If low-contrast icon data for icons, such as data in accordance with the standard image format FlashPix, is available, the icon data may be displayed.

It is so arranged that each icon image can be selected using the pointing device 102a.

If the button 27 is clicked, the next set of candidates, namely images corresponding to T(8) to T(15), is displayed in the areas 26a to 26h in reduced form. This operation can be repeated up to the image that corresponds to T(M−1).

[Step S165]

It is determined at step S165 whether the exit button 28 has been clicked. Processing is exited if the button is clicked; otherwise, control returns to step S161 and drawing of the illustration continues.

[Other Embodiments]

Since the above-mentioned degree of ambiguity applies equal values for R, G, B, this corresponds to varying the luminance component. However, the component that affects degree of ambiguity is not limited to this and an arrangement may be adopted in which color-difference components are varied. In this case, it will suffice to express the image features by YUV instead of RGB and to vary individually the degrees of ambiguity relating to Y, U and V.

Further, in the foregoing embodiment, the coefficient α for which the smallest image-to-image distance is obtained is selected. However, this is illustrative and limitative. In the foregoing embodiment, there is a large amount of calculation because image-to-image distance is calculated equally with regard to the three values of α. When it is desired to reduce the amount of processing, however, an arrangement may be adopted in which α is selected randomly with regard to all tiles (partial areas) instead of calculating all three candidates and selecting the one having the smallest value. By selecting α randomly for each tile, the number of candidates can be increased over that when processing is executed upon fixing α at 1, and effects that approximate those of the foregoing embodiment can be obtained.

Figure 10:
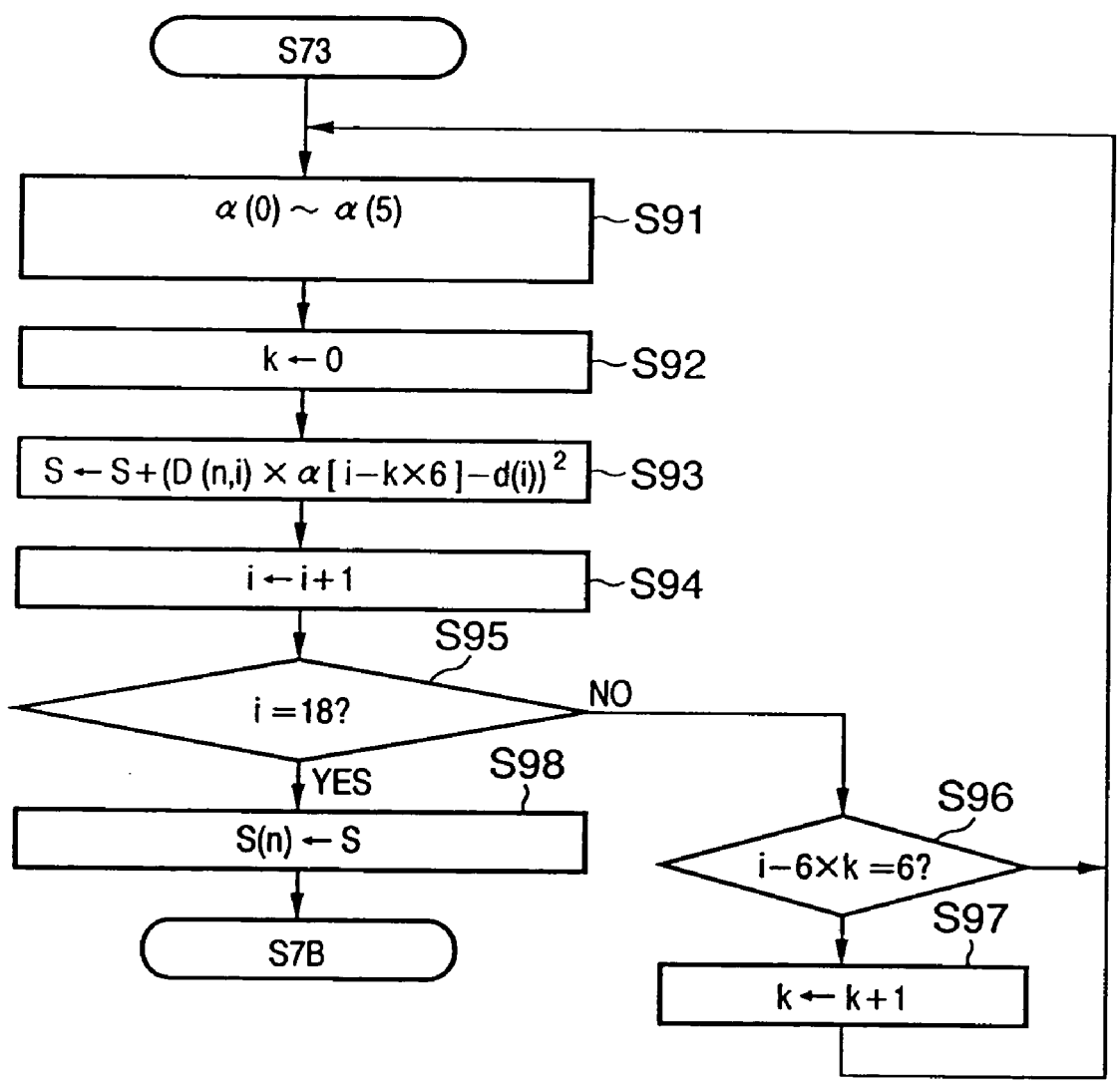
FIG. 10 is a flowchart useful in describing a procedure for calculating the distances between images according to another embodiment.

Processing in this case will be described with reference to FIGS. 10 and 11. FIG. 10 illustrates processing corresponding to steps S74 to S7A in the flowchart of FIG. 7.

Step S91 in FIG. 10 calls for α(0) to α(5) to be decided. In this embodiment, the image is divided into six areas, as shown in FIG. 4. Accordingly, the six coefficients α(0) to α(5) are assigned randomly to the six areas (0,0) to (2,1), as shown in FIG. 11. Step S91 is followed by step S92, at which the variable k is set to 0.

The image-to-image distance S is found through steps S93 to S95 using 18 features. Here the coefficient α is changed for every tile (partial area) in accordance with the aforesaid assignment. That is, the variable k is controlled in such a manner that α(0) to α(5) are selected periodically by the processing of steps S96, S97.

The image-to-image distance S obtained by the above-described processing is adopted as the image-to-image distance S(n) between an nth stored image and the presented image (step S98).

In the foregoing embodiment, the range of α is made ±20%. However, this may be increased or decreased depending upon image characteristics and operator preference. Alternatively, an arrangement may be adopted in which the range of α can be set at will by the operator.

In the processing shown in FIG. 7, α is changed in three steps. The similarity, however, can be set more in detail by increasing the number of steps of α. This is in the relation of the trade-off with the processing load. Therefore, it may be arranged so that the number of steps of α can be set by an operator.

The foregoing embodiment illustrates only one example of an algorithm for calculating α. Other algorithms may also be used. For example, in the description rendered above, α is varied over a number of steps and the one for which the shortest distance is obtained is selected. However, it may be so arranged that the most suitable value that prevails when α is varied in stepless fashion is adopted. That is, it will suffice to obtain the image-to-image distance by deciding the optimum α while α is in the process of being varied.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the invention is attained also by supplying a storage medium (or recording medium) storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiments and the storage medium storing the program codes constitutes the invention. Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiments.

Thus, as described above, the present invention makes it possible to perform image retrieval that accurately reflects the user's intention when a similar-image search is conducted using a presented image that is based upon the user's memory.

As many apparently widely different embodiments of the present invention can be made without departing from the spirit and scope thereof, it is to be understood that the invention is not limited to the specific embodiments thereof except as defined in the appended claims.

What is claimed is:

1. An image retrieval apparatus implemented in a computer system for retrieving a desired image from a plurality of stored images, comprising:

storage means for storing the plurality of images and an image feature set of each of the plurality of images in a form correlated with the image, wherein the image feature set of each image includes image features of a predetermined number of tile images obtained by dividing an image into the predetermined number of tiles;

feature calculation means for dividing a retrieval source image into the predetermined number of tile images and obtaining an image feature set of the retrieval source image by calculating an image feature of each of the tile images;

acquisition means for generating a plurality of image feature sets by multiplying an image feature included in an image feature set stored in said storage means by a constant, and acquiring a plurality of image feature sets regarding one image by varying the constant;

similarity calculating means for calculating degree of similarity between each of the plurality of images and the retrieval source image based on the plurality of image feature sets acquired by the acquisition means and the image feature set calculated by the feature calculation means, wherein said similarity calculating means calculates degree of similarity between each image feature set of the plurality of image feature sets acquired by said acquisition means and the image feature set calculated by said feature calculation means, and adopts maximum degree of similarity for each of the stored images as the degree of similarity between each of the stored images and the retrieval-source image; and retrieval means for retrieving the desired image from the plurality of stored images based on the degrees of similarity between the plurality of stored images and the retrieval source image, calculated by said similarity calculating means.

2. The apparatus according to claim 1, wherein said acquisition means generates N image feature sets by multiplying a luminance component of the image features that have been stored in said storage means by N constants.

3. The apparatus according to claim 1, wherein said acquisition means generates N image feature sets by multiplying a color-difference component of the image features that have been stored in said storage means by N constants.

4. The apparatus according to claim 1, wherein said acquisition means has specifying means for allowing an operator to specify number of steps over which the constant is varied as well as the amount of change provided by each step.

5. An image retrieval method implemented in a computer system for retrieving a desired image from storage means storing a plurality of images and an image feature set of each of the plurality of images in a form correlated with the image, wherein the image feature set of each image includes image features of a predetermined number of tile images obtained by dividing an image into the predetermined number of tiles, said image retrieval method comprising:
- a feature calculation step of dividing a retrieval source into the predetermined number of tile images and obtaining an image feature set of the retrieval source image by calculating an image feature of each of the tile images;
- an acquisition step of generating a plurality of image feature sets by multiplying an image feature included in an image feature set stored in the storage means by a constant, and acquiring a plurality of image feature sets regarding one image by varying the constant;
- a similarity calculating step of calculating degree of similarity between each of the plurality of images and the retrieval source image based on the plurality of image feature sets acquired at said acquisition step and the image feature set calculated at said feature calculation step, wherein said similarity calculating step calculates degree of similarity between each image feature set of the plurality of image feature sets acquired in said acquisition step and the image feature set calculated in said feature calculation step, and adopts maximum degree of similarity for each of the stored images as the degree of similarity between each of the stored images and the retrieval-source image; and
- retrieval step of retrieving the desired image from the plurality of stored images based on the degrees of similarity between the plurality of stored images and the retrieval source image, calculated by said similarity calculating means.

6. The method according to claim 5, wherein said acquisition step generates N image feature sets by multiplying a luminance component of the image features that have been stored in the storage means by N constants.

7. The method according to claim 5, wherein said acquisition step generates N image feature sets by multiplying a color-difference component of the image features that have been stored in said storage means by N constants.

8. The method according to claim 5, wherein said acquisition step includes a specifying step of allowing an operator to specify number of steps over which the constant is varied as well as the amount of change provided by each step.

9. A storage medium storing a control program for causing a computer to execute image retrieval processing for retrieving a desired image from storage means storing a plurality of images and an image feature set of each of the plurality of images in a form correlated with the image, wherein the image feature set of each image includes image features of a predetermined number of tile images obtained by dividing an image into the predetermined number of tiles, said control program being executed and implemented in a computer system comprising:
- a feature calculation step of dividing a retrieval source image into the predetermined number of tile images and obtaining an image feature set of the retrieval source image by calculating an image feature of each of the tile images;
- an acquisition step of generating a plurality of image feature sets by multiplying an image feature included in an image feature set in the storage means by a constant, and acquiring a plurality of image feature sets regarding one image by varying the constant;
- a similarity calculating step of calculating degree of similarity between each of the plurality of images and the retrieval source image based on the plurality of image feature sets acquired at said acquisition step and the image feature set calculated at said feature calculation step, wherein said similarity calculating step calculates degree of similarity between each image feature set of the plurality of image feature sets acquired in said acquisition step and the image feature set calculated in said feature calculation step, and adopts maximum degree of similarity for each of the stored images as the degree of similarity between each of the stored images and the retrieval-source image; and
- a retrieval step of retrieving the desired image from the plurality of stored images based on the degrees of similarity between the plurality of stored images and the retrieval source image, calculated by said similarity calculating means.

10. An image retrieval apparatus implemented in a computer system for retrieving a desired image from a plurality of stored images, comprising:
- input means for inputting a retrieval source image, the retrieval source image including color components;
- feature calculating means for obtaining an image feature set by calculating image feature of each color component of the retrieval source image, respectively;
- selection means for selecting one image from a plurality of images stored in a database;
- reading means for reading an image feature set of the selected image;
- generation means for generating a plurality of image feature sets by multiplying the image feature set of the retrieval source image or the image feature set of the selected image by a variable;
- calculation means for calculating a set of degrees of similarity between the retrieval source image and the selected image, using plurality of feature sets generated by said generation means;
- determination means for determining maximum degree of similarity for each of the stored images from the set of degrees of similarity as a degree of similarity between the retrieval source image and the selected image; and
- retrieval means for retrieving the desired image by repeating process by said selection means, said reading means, said generation means and said determination means.

11. An image retrieval method implemented in a computer system of retrieving a desired image from a plurality of stored images, comprising:
- an input step of inputting a retrieval source image, the retrieval source image including color components;

a feature step of obtaining an image feature set by calculating image feature of each color component of the retrieval source image, respectively;

a selection step of selecting one image from a plurality of images stored in a database;

a reading step of reading an image feature set of the selected image;

a generation step of generating a plurality of image feature sets by multiplying the image feature set of the retrieval source image or the image feature set of the selected image by a variable;

a calculation step of calculating a set of degrees of similarity between the retrieval source image and the selected image, using the plurality of feature sets generated in the generation step;

determination step of determining maximum degree of similarity for each of the stored images from the set of degrees of similarity as a degree of similarity between the retrieval source image and the selected image; and retrieval step of retrieving the desired image by repeating process at said selection step, said reading step, said generation step and said determination step.

* * * * *